United States Patent Office 3,354,348
Patented Nov. 21, 1967

3,354,348
HARMONIC PRODUCING VELOCITY MODULA-
TION TUBE HAVING PARTICULAR OUTPUT
CAVITY STRUCTURE
Bernardus Bastiaan van Iperen, Emmasingel, Eindhoven,
Netherlands, assignor to North American Philips Com-
pany, Inc., New York, N.Y., a corporation of Delaware
Filed Mar. 4, 1964, Ser. No. 349,399
Claims priority, application Netherlands, Mar. 5, 1963,
289,816
11 Claims. (Cl. 315—5.43)

ABSTRACT OF THE DISCLOSURE

A device for producing a harmonic of a high-frequency electromagnetic oscillation which employs a velocity modulated electron discharge tube in which the high-frequency oscillation is supplied to a resonator which serves as modulator for the electron beam, the latter being then velocity modulated and coupled to an output system through a resonant cavity the side walls of which extend substantially at right angles to the electron beam. In this device, the beam voltage is at least 10,000 volts.

Figure 1:
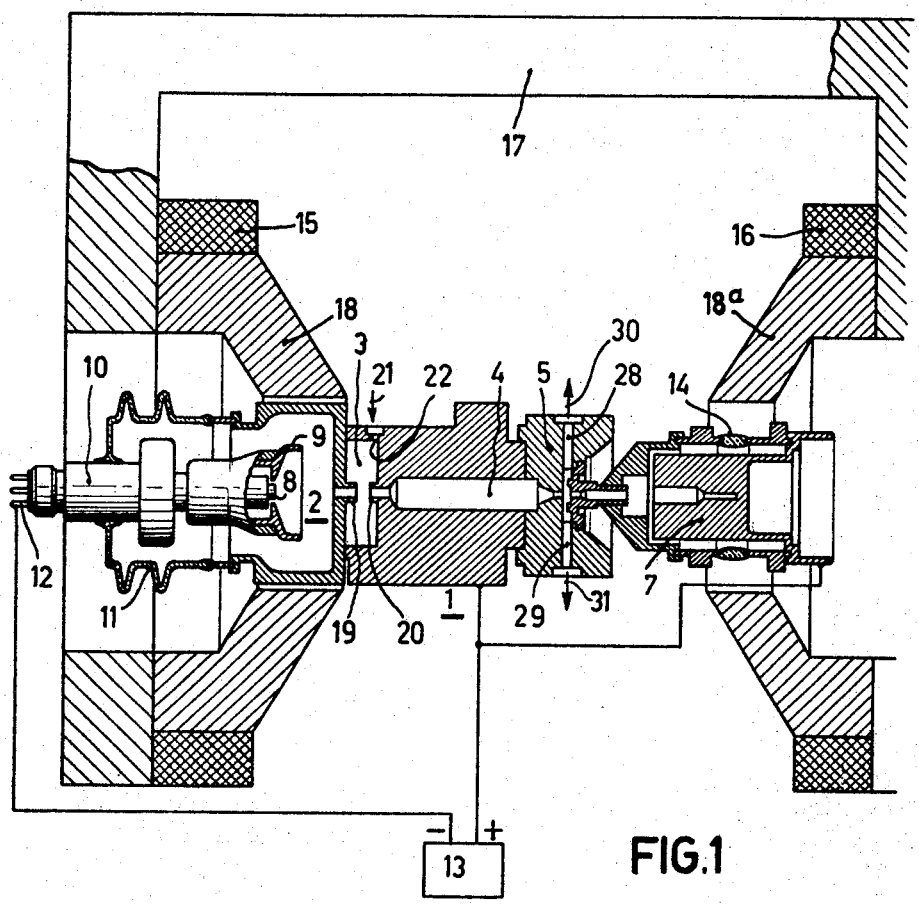

The invention relates to a device for producing a harmonic of a high-frequency electromagnetic oscillation by means of a velocity modulation tube, which comprises means for producing an electron beam which is focused by a magnetic field, and which, from a cathode, successively traverses at least one modulation system, a drift space and an output system, the high-frequency oscillation being supplied to the modulation system and the harmonic being derived from the output system. In addition the invention relates to a tube for such a device.

Devices and tubes of the above type are known to which decimeter or centimeter waves are supplied, which are produced with more or less common means and with which it is possible to produce harmonics with a wavelength of only a few centimeters. It has also been possible to penetrate, by frequency doubling, to the 4 mm. range starting from an oscillation having a wavelength of 8 mm.

Proportional reduction of the known devices and tubes, however, ordinarily cannot be used for producing even shorter waves in the millimeter or sub-millimeter range. Such a reduction would lead to such large cathode loads, such strong magnetic fields and such high dissipations, that realization thereof is very unlikely. In addition, the structures to be used in the tube would require too small proportions to be made without great difficulties.

It is an object of the invention to provide a device and an associated tube with which waves in the millimeter and sub-millimeter range can be produced in a comparatively simple manner and which is comparatively simple. The device according to the invention is characterized in that the output system comprises a resonant cavity the side walls of which are positioned in two planes which extend substantially at right angles to the electron beam and that the direct voltage of the electron beam is at least 10,000 volts.

From general considerations in velocity-modulated electron beams it might be concluded that it would be favourable, in contrast with the above value of at least 10,000 volts, to choose a value for this voltage which is as low as possible. As a matter of fact, known devices operate with a considerably lower beam voltage. However, if the output system is drawn into the considerations and this system comprises a resonant cavity having substantially flat walls, a so-called "non-re-entrant" resonant cavity, it appears that a larger output power is obtained if a higher beam voltage is chosen. A high beam voltage further has the advantage that at a given strength of the focusing magnetic field a smaller density of the cathode current is required, than in the case of a small D.C. voltage to obtain the same beam current strength. By using the higher beam voltage, the proportions of the systems in the tube can in addition be made larger, namely approximately proportional to the root from the direct voltage. Not only is the manufacture of the tube simpler, but in addition the distances between the electrodes of the electron gun become larger so that in spite of the higher beam voltage the breakdown problems become less serious.

The invention will now be described with reference to the drawing.

Figure 1A:
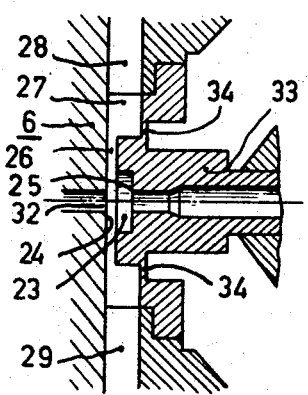
Figure 2:
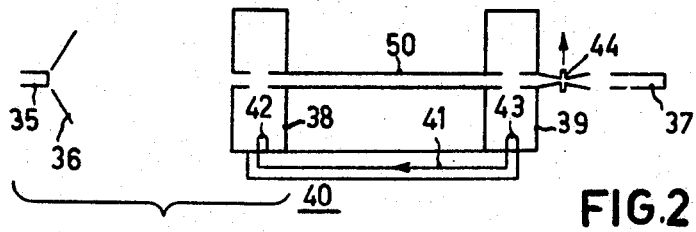
Figure 3:
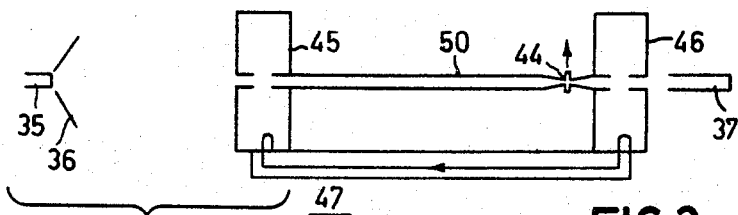
Figure 4:
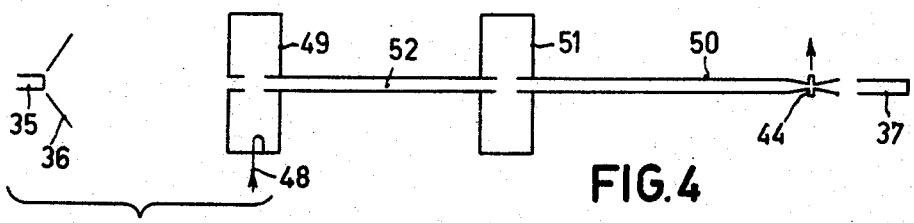
Figure 5:
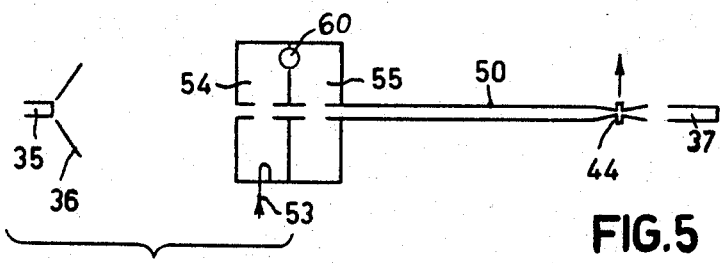
Figure 6:
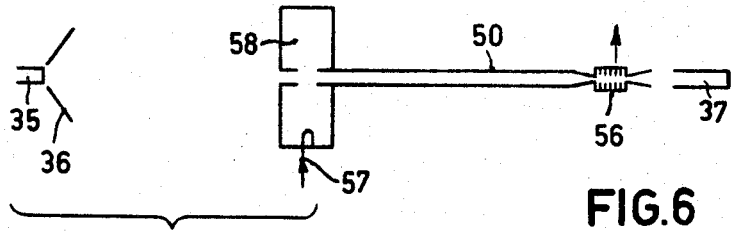

In the drawing, FIG. 1 shows in detail a non-oscillating embodiment; FIG. 1a is an enlarged view of the output system shown in FIG. 1; FIG. 2 is a device constructed as an oscillator; FIG. 3 is another embodiment of an oscillating device; FIG. 4 shows a non-oscillating device with amplification of the input signal; FIG. 5 shows a device, in which the input system consists of two coupled resonant cavities; and FIG. 6 shows a device in which the output system consists of a number of coupled resonant cavities. In the latter figures the showing omits all parts not essential to an understanding thereof.

The device shown in FIG. 1 comprises a velocity modulation tube 1 including an electron gun 2, a modulation system 3, a drift space 4, an output system 5, of which part is shown in greater detail in FIG. 1a at 6, and a collector part 7. The electron gun which comprises a cathode 8, which is preferably constructed as a dispenser cathode, and a focusing electrode 9. The supply leads for the focusing electrode, the cathode and the heating member of the cathode extend in a known and vacuum-tight manner via a socket 10 through a glass or ceramic part 11 of the wall of the tube where they are provided with contact pins. The contact pin 12 connected to the cathode 8 is connected to the negative terminal of a direct voltage source 13. The supply of the cathode and the voltage supplied to the focusing electrode may be effected in known manner which is not shown.

The part of the wall of the tube which comprises the foremost part of the electron gun, the modulation system, the drift space, and the output system, is manufactured from metal and connected to the positive terminal of the direct voltage source 13. The collector part 7 which is also manufactured from metal and which is connected in a vacuum-tight manner through a glass or ceramic ring 14 to the further metal housing is also connected to the positive terminal of the voltage source 13, although this is not necessary. It is entirely possible to choose the potential of the collector to be between that of the cathode and of the remaining part of the housing. In that case, in general more attention must be paid to the insulation of the collector part 7 than is the case in the tube according to FIG. 1.

The electron beam produced in the tube is focused by means of an axial rotation symmetrical magnetic field, which is produced with a magnet system mounted outside the tube. In the device shown in FIG. 1 this system consists of two coils 15 and 16, a yoke 17 and two pole shoes 18 and 18a. However, other known magnet systems may be used for this purpose also, which may also be provided wholly or partially inside the tube.

The electrons emerging from the cathode 8 are accelerated as a result of the beam voltage set up at the metal housing of the tube and focused by the magnetic field. The electron beam first axially traverses the modulation system 3 constructed as a toroidal resonant cavity. This resonant cavity is of the "re-entrant" type, in which an alternating voltage occurring across the gap constituted between the two cylindrical walls 19 and 20 will cause velocity modulation of the electron beam. It is noted that the two cylindrical parts 19 and 20 are not provided with grids.

A high-frequency oscillation is supplied in known manner to the resonant cavity through a wave guide not shown which is connected to a recess 21 in the wall of the tube and which is connected to the resonant cavity 3 through an aperture 22. The vacuum-tight sealing of the wall of the tube may be obtained also in known manner by means of a window of suitable material.

After the electron beam is modulated in velocity in the gap of the resonant cavity 3, it traverses the drift space 4 and then reaches the output system 5 which is partly shown on an exaggerated scale at 6 (FIG. 1a). This output system is constructed as a cylindrical box 23, which is traversed axially by the electron beam. The sidewalls 24 and 25 extend substantially at right angles to the direction of the electron beam and are substantially flat. The resonant cavity 23 is connected to the annular space 27 through the annular gap 26 having a radial dimension of approximately ¼ wavelength. This annular space 27 is connected to two wave guides 28 and 29. On the outside of the wall of the tube, wave guides may be connected in known manner at 30 and 31 for guiding the harmonic oscillation produced and for adaptation purposes respectively.

After the electron beam has traversed the output system, it is received by the collector 7.

In a device of the type described, an oscillation having a wavelength of 30 mm. was supplied to the resonant cavity 3 through the guide 22 and an oscillation having a wavelength of 2.5 mm. was derived from a resonant cavity 23 of the output system 5 through one of the guides 28 and 29. The voltage of the direct voltage source 13 was 25,000 volts. The direct current in the tube was 20 milliampere and the current density at the cathode 1.1 amperes per cm.$^2$, with a diameter of the cathode of 1.5 mm. The diameter of the hole 32 in the resonant cavity 23 was 0.5 mm. and the diameter of the electron beam was approximately 0.5 mm. The intensity of the magnetic field was approximately 1500 gauss. The power supplied was approximately 12.5 watts and the output power approximately 30 mwatt.

If for producing an oscillation of 2.5 mm. wavelength a reflex klystron were used, the current density at the cathode would be approximately 7 amperes per cm.$^2$ instead of 1.1 amperes/cm.$^2$ in the tube according to the invention. The smallest diameter occuring in a reflex klystron, namely that of the hole of the resonant cavity, is 0.15 mm. as against 0.5 mm. for the diameter of the hole 32 in the tube according to the invention. The dissipation in a reflex klystron is approximately 45 watts, which power is also dissipated in the proximity of the resonant cavity 23 of the tube according to the invention but in this case the area is much larger.

Also in connection with the dissipation, it is of great importance that no "re-entrant" parts are available in the resonant cavity 23 since these would have to have very small proportions and would consequently soon be overheated.

One of the flat sidewalls, namely 25, and the cylindrical wall are preferably formed by an annular metal member 33 which is provided with a thin plate-shaped part 34 which can be rather easily deformed. In this manner it is possible to adjust the desired resonant frequency of the resonant cavity 23 by moving the member 33 in the axial direction.

In connection with the maximum possible modulation depth which can be obtained in the modulator of the described device in accordance with the value of the power supplied, it is desirable that the admittance of the electron beam, i.e. the quotient of the current strength in amperes and the beam voltage in volts, be smaller than $5 \times 10^{-6}$ amp./volt.

It has appeared in addition that it is necessary for obtaining a maximum efficiency that the diameter of the electron beam equal between one half and the electronic wavelength of the output signal. By the electronic wavelength of the output signal is to be understood throughout the specification and claims, the distance between the electron bunches in the electron beam which correspond to the frequency of the output signal. The electronic wavelength $\lambda_e$ in the non-relativistic range is associated with the wavelength $\lambda_o$ in air according to the formula $$\lambda_e = \lambda_o \frac{\sqrt{V_o}}{500}$$

where $V_o$ is the direct voltage of the electron beam in volts. In the present case $\lambda_o = 2.5$ mm. and $V_o = 25,000$ volts, from which its follows that $\lambda_e = 0.8$ mm. The diameter of the electron beam is approximately 0.50 mm. which lies between one half and the electronic wave length of the output signal.

As stated, the above-described device produces the twelfth harmonic of the supplied oscillation. Thus in this case, starting from an oscillation with a wavelength of 30 mms., an output oscillation with a wavelength of 2.5 mm. is formed. In this case the smallest dimension which must be realized in the tube, the diameter of the hole 32 in the output resonant cavity, still is 0.5 mm. This comparatively large dimension, the small current density at the cathode and the comparatively low magnetic field strength permit a reduction, which is required for producing oscillations of shorter wavelengths.

In the device shown in FIG. 1 a high-frequency oscillation is externally supplied. However, it is also possible, to construct the device as an oscillating device, as will be explained with reference to the diagrammatic FIGS. 2 and 3. In these figures, as well as in FIGURES 4, 5 and 6, the magnetic focusing system, the voltage supply and a number of further structural details which are not of importance for a good understanding of the invention, are not shown. Corresponding parts of these figures are numbered correspondingly.

The device shown in FIG. 2 comprises a tube with a cathode 35, a focusing electrode 36 and a collector 37.

The system for producing the fundamental oscillation comprises two "re-entrant" resonant cavities 38 and 39 which are regeneratively coupled together through a coaxial line 40, of which the inner guide 41 is provided with a coupling loop 42 in the resonant cavity 38 and a coupling loop 43 in the resonant cavity 39. It is clear that at higher frequencies preferably a wave guide will be used for coupling the two resonant cavities which may be effected in otherwise known manner. Between the two resonant cavities a drift space 50 is provided. In case of correct coupling, a high-frequency electromagnetic oscillation is produced by this system, the frequency of which is substantially determined by the natural frequencies of the resonant cavities 38 and 39. The electron beam is modulated in velocity and then in density under the influence of this oscillation and then passes the resonant cavity 44 from which the higher harmonic oscillation is derived.

In the device shown in FIG. 3, the velocity modulation takes place by means of the resonant cavity 45, which is coupled regeneratively to a second resonant cavity 46 in a manner analogous to that in FIG. 2, through the coaxial line 47, which cavity 46, however, in this case is disposed after the output resonant cavity 44.

The device shown in FIG. 4, does not operate as an oscillator but with amplification of the supplied signal. The input oscillation is supplied at 48 to a first resonant cavity 49. Somewhat further on in the direction of the electron beam after the drift space 52 a second resonant cavity 51 is provided tuned to the frequency of the input signal in a manner such that there an amplification of the supplied signal occurs.

In the device shown in FIG. 5, the high-frequency oscillation is supplied at 53 to the resonant cavity 54 of the assembly of resonant cavities 54 and 55 coupled together in known manner through an aperture and a coupling loop 60.

Finally FIGURE 6 shows a device in which the output system 56 consists of a number of resonant cavities coupled together. The input signal is supplied to the resonant cavity 58 at 57.

What is claimed is:

1. A velocity modulated electron discharge tube for producing a harmonic of a high-frequency electromagnetic oscillation comprising in succession within an evacuated envelope means to generate and direct an electron beam along a given axis, a modulation system, a drift space, and an output system comprising a resonant cavity in the path of said electron beam coupled to a wave-guide through an annular gap formed by walls perpendicular to the axis of the electron beam, said gap having a radial dimension of approximately one-quarter wave-length at the harmonic frequency, said resonant cavity having spaced parallel side-walls extending in two planes substantially perpendicular to the electron beam axis.

2. A velocity modulated electron discharge tube as claimed in claim 1, in which one of the side-walls of the output system resonator is a metal member having a thin, easily deformed, plate-shaped portion for adjusting the resonant frequency of the resonant cavity.

3. A velocity modulation tube as claimed in claim 1, in which the modulation system is one of two regeneratively coupled resonant cavities.

4. A velocity modulation tube as claimed in claim 3, in which the output system is disposed between the two regeneratively coupled resonant cavities.

5. A velocity modulation tube as claimed in claim 3, in which the regeneratively coupled resonant cavities precede the output resonant cavities.

6. A device for producing a harmonic of a high-frequency electromagnetic oscillation comprising a velocity modulated electron discharge device including means for producing an electron beam directed along a given axis, magnetic field producing means for focussing the beam, a modulation system traversed by said electron beam including means to receive an electromagnetic wave of a given frequency and modulate the electron beam therewith, a drift space traversed by said modulated electron beam and an output system for deriving from said modulated electron beam a harmonic of said electromagnetic oscillation received by said modulation system, said output system comprising a resonant cavity in the path of said electron beam coupled to a wave-guide through an annular gap formed by walls perpendicular to the axis of the electron beam, said gap having a radial dimension of approximately one-quarter wave-length at the harmonic frequency, said resonant cavity having spaced parallel side-walls extending in two planes substantially perpendicular to the electron beam, said device further including means to apply a voltage of at least 10,000 volts to said electron beam.

7. A device as claimed in claim 6, in which the admittance of the electron beam is smaller than $5 \times 10^{-6}$ amp./volt.

8. A device as claimed in claim 6, in which the diameter of the electron beam equals between one half and the electronic wavelength of the output signal.

9. A device as claimed in claim 6, in which the modulation system is one of two regeneratively coupled resonant cavities.

10. A device as claimed in claim 9, in which the output system is disposed between regeneratively coupled resonant cavities.

11. A device as claimed in claim 9, in which the two regeneratively coupled resonant cavities precede the output resonant cavities.

References Cited

UNITED STATES PATENTS 2,424,959   8/1947   Alford _____ 315—5.43

FOREIGN PATENTS 541,623   12/1941   Great Britain.

HERMAN KARL SAALBACH, *Primary Examiner.*

P. L. GENSLER, *Assistant Examiner.*